(12) United States Patent
Ochocinski et al.

(10) Patent No.: US 9,061,598 B2
(45) Date of Patent: Jun. 23, 2015

(54) METHOD AND SYSTEM FOR PROVIDING CHARGING CORD REMINDER AND FAULT OVERRIDE FOR PLUG-IN ELECTRIC VEHICLES

(71) Applicant: Ford Global Technologies, LLC, Dearborn, MI (US)

(72) Inventors: Christopher Adam Ochocinski, Canton, MI (US); Ryan J. Skaff, Farmington Hills, MI (US); Matthew Roger DeDona, Northville, MI (US); Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/013,380

(22) Filed: Aug. 29, 2013

(65) Prior Publication Data

US 2015/0066257 A1 Mar. 5, 2015

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 11/18* | (2006.01) |
| *B60L 3/00* | (2006.01) |
| *B60W 20/00* | (2006.01) |

(52) U.S. Cl.
CPC ............. *B60L 11/1838* (2013.01); *B60L 3/00* (2013.01); *B60W 20/50* (2013.01); *Y10S 903/903* (2013.01)

(58) Field of Classification Search
None
See application file for complete search history.

(56) References Cited

U.S. PATENT DOCUMENTS

| 7,595,607 | B2 | 9/2009 | Lambert et al. | |
|---|---|---|---|---|
| 7,769,505 | B2 | 8/2010 | Rask et al. | |
| 7,791,217 | B2 | 9/2010 | Kamaga | |
| 2010/0320018 | A1 | 12/2010 | Gwozdek et al. | |
| 2011/0178663 | A1 | 7/2011 | Crombez | |
| 2012/0283894 | A1* | 11/2012 | Naboulsi | 701/1 |
| 2012/0330489 | A1* | 12/2012 | Masuda | 701/22 |
| 2013/0193918 | A1* | 8/2013 | Sarkar et al. | 320/109 |
| 2013/0332019 | A1* | 12/2013 | Goto et al. | 701/22 |
| 2014/0292078 | A1* | 10/2014 | Northall | 307/10.1 |

OTHER PUBLICATIONS

Ryuichi Kamaga, et al., Development of Plug-In Hybrid Control ECU, http://www.fujitsu-ten.com/business/technicaljournal/pdf/35-2.pdf, Jul. 2010.

* cited by examiner

*Primary Examiner* — Rami Khatib
(74) *Attorney, Agent, or Firm* — David B. Kelley; Brooks Kushman P.C.

(57) ABSTRACT

An operation includes disabling a vehicle from moving while connection status of the vehicle with external charging infrastructure is unknown. A message is generated to advise a user to check the connection status. The vehicle is enabled to move upon a user indication that the vehicle is disconnected from the charging infrastructure.

17 Claims, 3 Drawing Sheets

METHOD AND SYSTEM FOR PROVIDING CHARGING CORD REMINDER AND FAULT OVERRIDE FOR PLUG-IN ELECTRIC VEHICLES

TECHNICAL FIELD

The present invention relates to charging plug-in vehicles with electrical energy from an external electrical grid.

BACKGROUND

A plug-in electric vehicle such as a battery electric vehicle (BEV), a plug-in hybrid electric vehicle (PHEV), and the like includes a traction battery configured to supply electrical energy to propel the vehicle. The vehicle is configured to enable the battery to be charged with electrical energy from an external electrical grid during a charging operation. The vehicle is equipped with a battery charger having an associated receptacle into which an external power supply cord connected to a wall-outlet can be plugged for charging the battery. As a plug-in vehicle depends on being charged via external charging infrastructure, a concern is that the vehicle and/or the charging infrastructure including the cord set can be damaged in the event of a drive away while the cord set is attached to the vehicle.

SUMMARY

A plug-in vehicle such as a battery electric vehicle (BEV), a plug-in hybrid electric vehicle (PHEV), and the like is typically configured such that vehicle movement is prevented when the charging cord set is plugged into the vehicle. That is, a plug-in vehicle is to be disabled from driving when "plugged-in". However, under certain failure modes, the plug status cannot be detected by the vehicle plug status detection system (for instance, by the battery charger and/or the electronic control unit (ECU) of the vehicle). That is, at times it is unclear as to whether the plug status is plugged-in or "unplugged". A typical solution is to fail-safe the plug status as being plugged-in when the plug status is not clear. This prevents accidental drive away of the vehicle, but also prevents drive-away (no-start) with a faulted plug status detection system.

In accordance with embodiments of the present invention, in response to the plug status being faulty or unclear such that the plug status cannot be determined or is unobservable, the vehicle user is requested to verify that the vehicle is unplugged prior to the vehicle being allowed to be started and driven. For instance, the user is prompted via the instrument cluster and/or steering wheel controls to verify that the charge cord is actually unplugged from the vehicle. Once the user confirms that the charge cord is unplugged, the vehicle is allowed to be started, shifted out of park, and driven. Otherwise, the vehicle is prevented from being started and driven.

An embodiment of the present invention provides a method which includes disabling a vehicle from moving while connection status of the vehicle with external charging infrastructure is unknown. The method further includes generating a message to advise a user to check the connection status and enabling the vehicle to move upon a user indication that the vehicle is disconnected from the charging infrastructure.

An embodiment of the present invention provides a system having a controller. The controller is configured to disable a vehicle from moving while connection status of the vehicle with external charging infrastructure is unknown, generate a message to advise a user to check the connection status, and enable the vehicle to move upon a user indication that the vehicle is disconnected from the charging infrastructure.

An embodiment of the present invention provides a method for a plug-in vehicle. The method includes detecting the connection status between the vehicle and a charge cord. The method further includes enabling the vehicle to move while the detected connection status is clear that the cord is unplugged from the vehicle and disabling the vehicle from moving while the detected connection status is clear that the cord is plugged into the vehicle. The method further includes, while the detected connection status is unclear as to whether the cord is unplugged from or plugged into the vehicle, disabling the vehicle from moving, generating a message to advise a user to check the connection status, and enabling the vehicle to move upon a user indication that the cord is unplugged from the vehicle.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
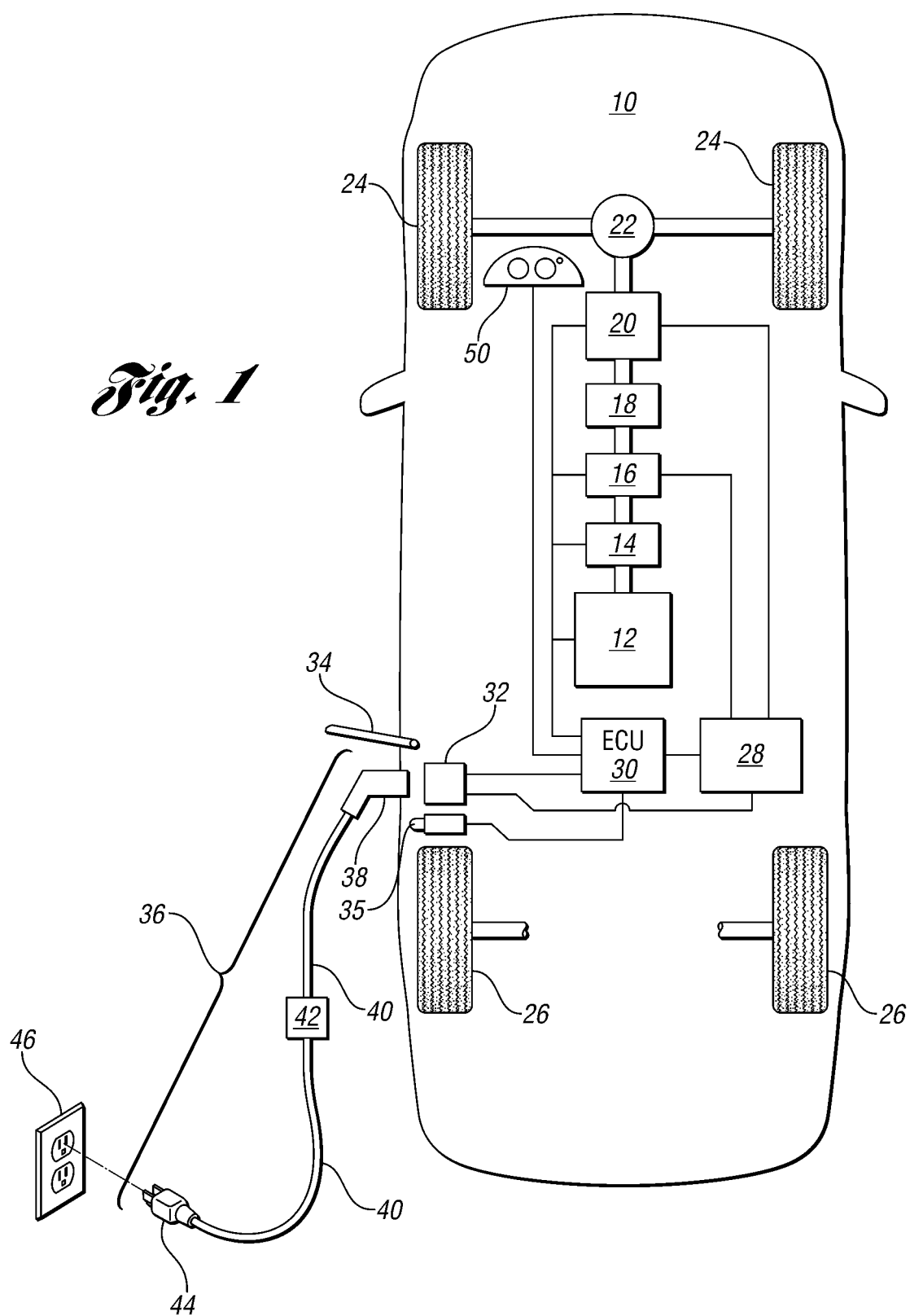
FIG. 1 illustrates a block diagram of a plug-in electric vehicle in accordance with an embodiment of the present invention.

Referring now to FIG. 1, a schematic of a plug-in electric vehicle 10 in accordance with an embodiment of the present invention is shown. Vehicle 10 is shown by way of example as being a plug-in hybrid electric vehicle (PHEV) instead of, for instance, as being a battery electric vehicle (BEV). The powertrain of vehicle 10 includes: an internal combustion engine 12, a clutch 14, a generator 16, a planetary gear set 18, and an electric motor 20. The powertrain is coupled to a differential 22 which is coupled to the axle having driven wheels 24. Vehicle 10 also has non-driven wheels 26.

Vehicle 10 includes a traction battery 28. Battery 28 is coupled to generator 16 and motor 20 to supply electrical energy in order to propel vehicle 10. Battery 28 is rechargeable with electrical energy from an external electrical grid during charging operations.

Vehicle 10 further includes an electronic control unit (ECU) 30. ECU 30 is coupled to engine 12, clutch 14, generator 16, motor 20, and battery 28. In FIG. 1, a single ECU 30 is illustrated. However, it is common to have distributed computing involving multiple ECUs instead of a single ECU. For illustration purposes and ease of description, computing and control functionality is described in regards to a single ECU with the understanding that such functionality can be separated among multiple processors including, as described below, a battery charger of vehicle 10.

Vehicle 10, as a plug-in vehicle, further includes an electrical receptacle 32 and a battery charger. In FIG. 1, the battery charger is shown as being integrated into electrical receptacle 32. However, the battery charger may be a separate module or may be integrated into or a part of ECU 30. Electrical receptacle 32 has an associated protective door 34. In FIG. 1, protective door 34 is shown in an opened position in which receptacle 32 is exposed for receipt of an external charging cord. Protective door 34 is movable to a closed position covering receptacle 32 to keep away dirt, dust, and moisture from the environment when battery charging is not occurring. A pin switch 35 is provided on vehicle 10 proximate protective door 34. ECU 30 is configured to read pin switch 35 to determine whether protective door 34 is opened or closed.

As described, vehicle 10 is shown in FIG. 1 as being a PHEV. In an alternative embodiment, vehicle 10 is a battery-only electric vehicle (BEV). Such a BEV is also a plug-in vehicle and includes electrical receptacle 32 with the battery charger for charging battery 28 from the external electric grid.

The external charging infrastructure for connecting with vehicle 10 to enable battery 28 to be recharged with electrical energy from the external electrical grid includes a charging cord set 36. Charging cord set 36 includes an electrical coupler 38 and two lengths of cable 40. An electrical vehicle supply equipment (EVSE) 42 device is between cables 40. Coupler 38 couples with (i.e., plugs into) receptacle 32 of vehicle 10 during charging. In some embodiments, EVSE device 42 includes fuses, relays, transformers, and a circuit board with processing capability. Cord set 36 further includes an electrical plug 44. Plug 44 can be plugged into a wall outlet 46 that is electrically connected to an external electric grid. Thus, battery 28 is recharged with electrical energy from the external electric grid when coupler 38 of cord set 36 is plugged into receptacle 32 of vehicle 10 and plug 44 of cord set 36 is plugged into wall outlet 46.

The plug status of vehicle 10 is "plugged-in" (i.e., "on plug") when coupler 38 of cord set 36 is coupled with receptacle 32 of vehicle 10. The plugged-in status does not depend on whether plug 44 of cord set 36 is plugged into wall outlet 46. While the plug status is plugged-in, it is likely that plug 44 will be plugged into wall outlet 46 in order to enable battery 28 to be recharged with electrical energy from the electrical grid.

The plug status of vehicle 10 is "unplugged" (i.e., "off plug") when coupler 38 of cord set 36 is not coupled with receptacle 32 of vehicle 10. Again, the unplugged status does not depend on whether plug 44 of cord set 36 is plugged into wall outlet 46.

The plug status of vehicle 10 is "faulty" whenever the plug status is unclear as a result of not being able to be determined or is otherwise unobservable. In this case, although the actual plug status is either plugged-in or unplugged, the plug status is unknown by the plug status detection system of vehicle 10 (e.g., the plug status is unknown by the battery charger and/or ECU 30 of vehicle 10).

Vehicle 10 and/or charging cord set 36 can become damaged if vehicle 10 is driven away when the plug status is plugged-in (i.e., when cord set 36 is coupled to vehicle 10, especially while cord set 36 is coupled to wall outlet 46).

To avoid such damage, an interlock system is provided in which ECU 30 prevents the powertrain from driving away in response to a cord set indicator indicating that cord set 36 is coupled to vehicle 10. For instance, in some embodiments, two-position pin switch 35 indicates to ECU 30 whether protective door 34 is opened or closed. Door 34 being closed provides an indication that cord set 36 is unplugged as cord set 36 cannot be plugged into receptacle 32 when door 34 is closed. Door 34 being opened is not determinative as to whether cord set 36 is plugged-in or unplugged. In other embodiments, ECU 30 detects whether coupler 38 of cord set 36 is connected to receptacle 32. This can be accomplished via a switch proximate receptacle 32, similar to pin switch 35, which coupler 38 actuates when connected to receptacle 32. In other embodiments, as described below, ECU 30 detects whether cord set 36 is connected to receptacle 32 based on electrical properties.

Regulations such as SAE J2344 (USA+) and ECE R100 (EU+) state that a plug-in vehicle (e.g., vehicle 10) is to be equipped with an interlock that will prevent application of drive power while the vehicle is mechanically connected to the off-board charging infrastructure. Such regulations further state that a plug-in vehicle is not to be capable of moving by its own means when the vehicle is galvanically connected to the off-board charging infrastructure. The SAE J1772 standard defines the interface between vehicle 10 and the charging infrastructure via cord set 36 and connectors (e.g., receptacle 32 of vehicle 10 and coupler 38 of cord set 36). A problem is that there are specific states of the signal inputs to the battery charger and/or ECU 30 from cord set 36 and the connectors that indicate vehicle 10 may be plugged-in or may have faulted inputs. There is no redundancy on these signal states that can assist in distinguishing a single point failure of the input and an unpowered but plugged-in cord set 36. Therefore, at these indeterminate states, without more, ECU 30 fails-safe and disables vehicle 10. This prevents accidental drive away of vehicle 10 in case cord set 36 is connected to vehicle 10.

As indicated, a plug-in vehicle such as vehicle 10 is not to allow the driving mode when plugged-in. Standards and regulations including the noted SAE J2344 (USA+) and ECE R100 (EU+) are concerned with safe operation of the unique features of plug-in, battery-operated, electric vehicles (applicable to any plug-in vehicle). A specific requirement inhibits or prevents the vehicle powertrain from applying propulsion torque when charge cord set 36 is plugged-in to vehicle 10. There is a complexity with this requirement. With a charge cord set compliant with J1772 (USA+) (IEC 62186 uses the same control signal interface), there are two specific failure modes where the plug status cannot be determined (off-plug is unobservable): a. Proximity signal voltage=5V (short circuit to 5V)+Pilot signal voltage=0V; and b. Proximity signal voltage=0V (short circuit to GND)+Pilot signal voltage=0V. The normal case for off-plug: Proximity signal voltage=4.56V+Pilot signal voltage=0V.

As noted, there are two specific failure modes of the charge cord interface such that the plug status cannot be detected. The "pilot" and "proximity" signals can be used to detect if charge cord set 36 is plugged-in. The pilot signal is powered whenever cord set 36 is connected to utility power via wall outlet 46. The pilot signal is normally a powered signal (PWM or 12V) supplied from EVSE device 42 (Electric Vehicle Supply Equipment/off-board charging station) that indicates the electrical current capability of EVSE device 42. If the pilot signal is powered, then it indicates that vehicle 10 is plugged-in regardless of the proximity switch reading. It is also normal for the pilot signal to be unpowered when the proximity switch is closed as the utility power is not present (i.e., not plugged into wall outlet 46, EVSE device 42 does not have power).

The proximity signal is of a resistor network with some active switches. The J1772 design has resistors between the signal line, the supply voltage, and ground. The battery charger and/or ECU 30 observe a proximity voltage of 4.56V when not plugged-in. Most all other voltage measurements define some level of connection. There are two voltage measurements that indicate a failure where proximity is unknown. If the proximity is shorted to the supply voltage (5V), then any connection is unobservable by the proximity measurement. Similarly, if the proximity is shorted to ground (0V), then any connection is unobservable by the proximity measurement.

The faulted proximity signal may be caused by damage such as in the battery charger, in the vehicle-side J1772 connector, the vehicle wiring, the EVSE-side J1772 connector, or the EVSE device. The proximity detection may also be damaged through intentional tampering or vandalism. In these cases, vehicle 10 should still be permitted to operate.

As noted, there are two cases where the plug status cannot be determined with certainty as being unplugged. The two cases have the pilot signal at 0V and a faulted proximity signal. Clearly, the plug status is not sufficiently plugged-in for normal operation of charging, but the vehicle control system (i.e., ECU 30) cannot detect with certainty that vehicle 10 is unplugged.

A solution in accordance with embodiments of the present invention entails having the vehicle user manually override the plug status when the vehicle control system cannot detect the plug status of vehicle 10.

Figure 2:
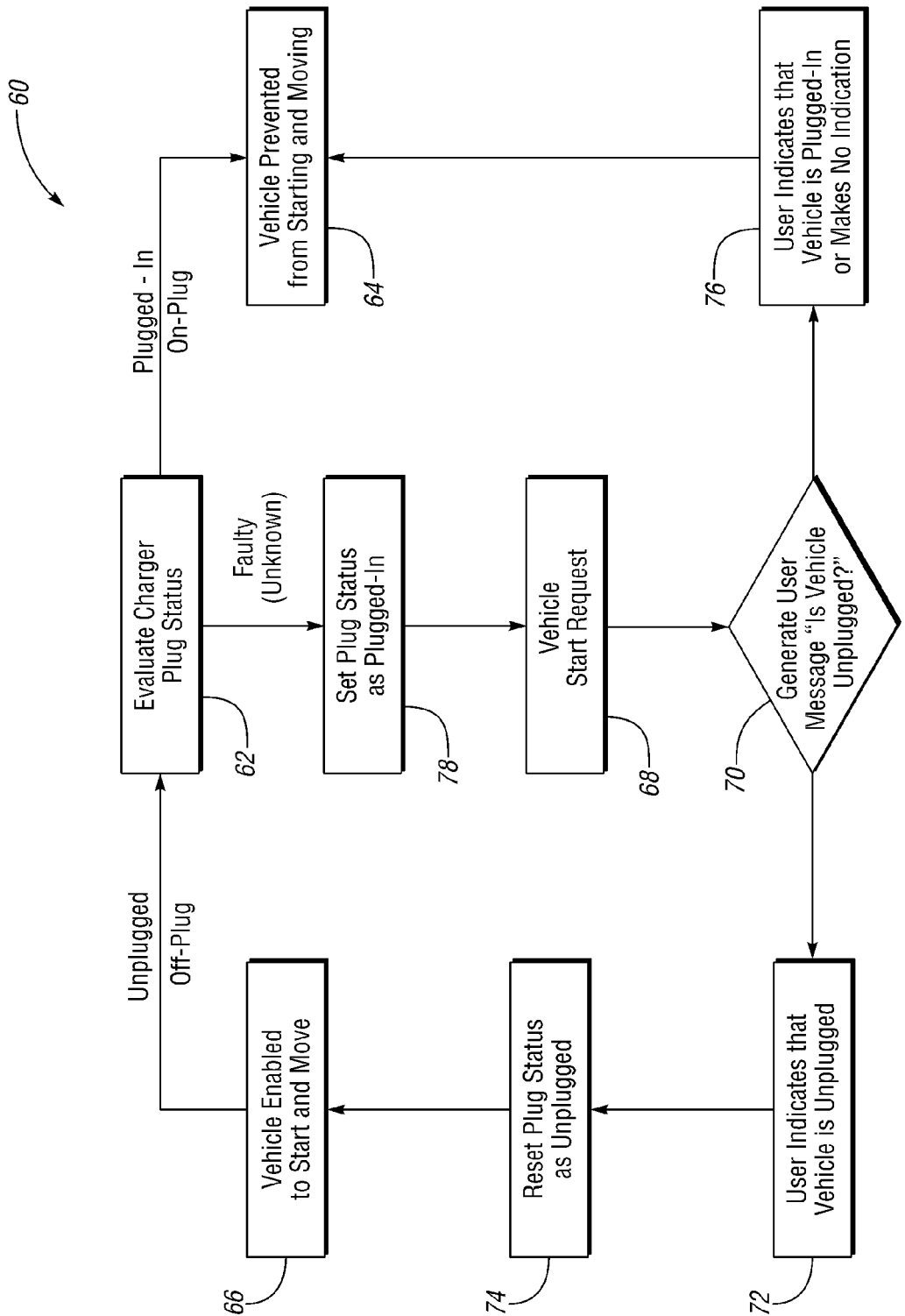
FIG. 2 illustrates a flowchart describing operation of a method and a system for providing a charge cord plugged-in reminder and charge cord fault override for plug-in electric vehicles in accordance with an embodiment of the present invention.

Referring now to FIG. 2, with continual reference to FIG. 1, a flowchart 60 describing operation of a method and a system for providing a charge cord plugged-in reminder and charge cord fault override for plug-in electric vehicles in accordance with an embodiment of the present invention is shown. The operation begins with the vehicle control system (i.e., ECU 30 and/or the battery charger) evaluating the plug status of vehicle 10 as shown in block 62. As noted above, the plug status may be plugged-in, unplugged, or faulty. When the control system can detect the plug status as being either plugged-in or unplugged, vehicle 10 is operated normally. For instance, when the control system detects the plug status as being plugged-in, vehicle 10 is prevented by the interlock from being started or moved as shown in block 64. Conversely, when the control system detects the plug status as being unplugged, the interlock is cleared and vehicle 10 is allowed to be started and moved as shown in block 66.

When the control system cannot detect the plug status in block 62, then the control system considers the plug status to be faulty. As noted above, the plug status is faulty whenever the plug status cannot be deduced or is unobservable by the control system. In this case, although the actual plug status may be unplugged, the control system fail-safes the plug status as being plugged-in as shown in block 78. As a result, vehicle 10 is prevented from being started or moved (non-motive start only) until the vehicle user overrides the plug status as being unplugged.

In response to the vehicle user generating a vehicle start request (such as by turning the ignition) as in block 68 while the plug status is faulty, the control system interfaces with the user to advise the user to physically check the connection status of charging cord set 36. For instance, the control system generates or displays a message for the user on an operator indicator such as a vehicle instrument cluster 50. The message is something to the effect of "Is vehicle unplugged?" as shown in block 70. The message is a request to the user to verify whether or not charging cord set 36 is actually connected to or disconnected from receptacle 32 of vehicle 10 (i.e., to verify whether the plug status is plugged-in or unplugged).

The vehicle user can indicate the plug status using the steering wheel controls or the like in response to the message. Upon an indication from the user that the actual plug status is unplugged as in block 72, the control system overrides the plug status to be set as unplugged as indicated in block 74. That is, in block 74, the control system resets the plug status to be unplugged instead of plugged-in. As such, the control system resets the plug status to be unplugged in the event that the user overrides the plug-status by indicating that the actual plug status is unplugged in block 72. In turn, vehicle 10 is allowed to be started and driven (motive start) as shown in block 66. The override process is repeated after every key-off event until vehicle 10 is repaired.

Alternatively, in response to the message in block 70, the vehicle user can either indicate that the actual plug status is plugged-in or provide no indication regarding the plug status as shown in block 76. In either case, the control system maintains the fail-safe plugged-in status as plugged-in. The control system maintains the plugged-in status regardless of whether the actual plug status is plugged-in or unplugged. In turn, vehicle 10 is prevented from being started or moved as shown in block 64.

In summary, the vehicle user override of a charge plug fault requires user input. The control system can normally detect whether charge cord set 36 is connected to or disconnected from vehicle 10. Through the use of the J1772 pilots and proximity signals, the control system can determine the charge plug status. As noted, there are two fault conditions where robust charge plug status is unobservable. In these cases, the control system sets the plug status to faulty.

The plug status is faulty (i.e., unobservable) when the proximity is faulted (two states) and the pilot signal is off. The interface is constrained by SAE J1772 and every vehicle using this interface has this issue by design. The simple fail-safe is to set the plug status as being plugged-in. In accordance with embodiments of the present invention, the control system provides a plug status reminder and a faulty plug status override when the plug status is faulty. The control system provides the plug status reminder in response to the user attempting to start vehicle 10 while the plug status is faulty. The plug status reminder entails the control system generating a message on instrument cluster 50 reminding the user to check the connection status of cord set 36. This message such as "The vehicle is plugged-in" is an addition to the typical on-plug icon on instrument cluster 50. The faulty plug status override entails the control system generating a message on instrument cluster 50 requesting the user to verify the connection status of cord set 36. This message is something to the effect of "Is the vehicle unplugged". If the user verifies that cord set 36 is unplugged, then the vehicle starting and drive is enabled at key start. Otherwise, the control system considers cord set 36 to be plugged-in and the vehicle starting is inhibited.

Figure 3:
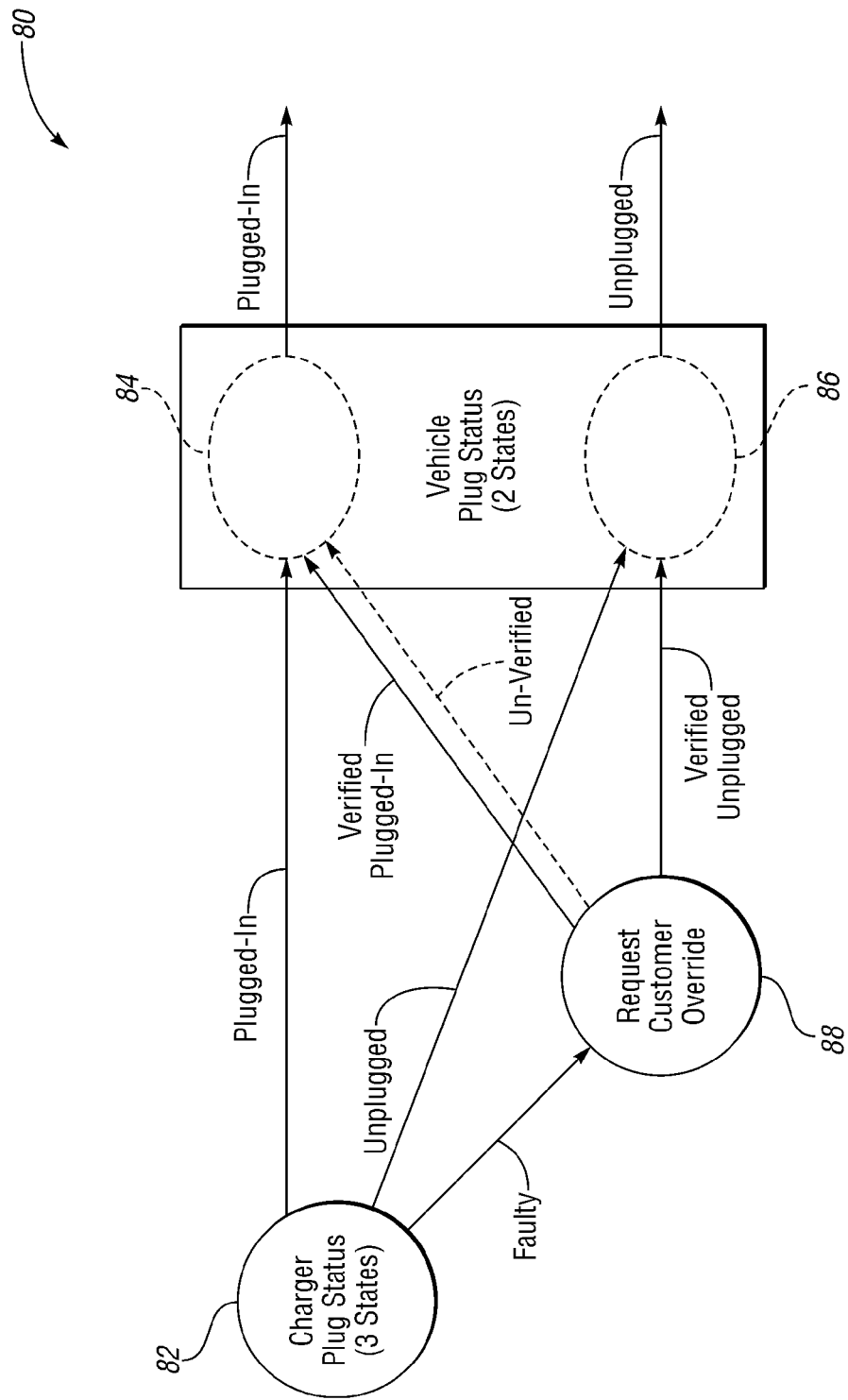
FIG. 3 illustrates a schematic further describing operation of a method and a system for providing a charge cord plugged-in reminder and charge cord fault override for plug-in electric vehicles in accordance with an embodiment of the present invention.

Referring now to FIG. 3, with continual reference to FIGS. 1 and 2, a schematic 80 further describing operation of a method and a system for providing a charge cord plugged-in reminder and charge cord fault override for plug-in electric vehicles in accordance with an embodiment of the present invention is shown. As noted above, the charger plug status includes three states as indicated in circle 82: plugged-in; unplugged; and faulty (cannot detect/unobservable). The control system gets the input from the charger plug status. The control system then arbitrates the charger plug status and the vehicle user override feedback to generate a binary vehicle plug status.

When the charger plug status is plugged-in while the user attempts to start the vehicle, the arbitrated vehicle plug status is also plugged-in as indicated in circle 84. Similarly, when the charger plug status is unplugged while the user attempts to start the vehicle, the arbitrated vehicle plug status is also unplugged as indicated in circle 86. As such, when the charge plug status is either plugged-in or unplugged while the user attempts to start vehicle 10, the vehicle behavior is normal. Vehicle 10 does not start when plugged-in (non-motive start). Vehicle 10 does start when unplugged (motive start).

When the charger plug status is faulty the user is requested to provide an override in response to the user attempting to start the vehicle as indicated in circle 88. The arbitrated vehicle plug status is plugged-in until a valid override from the user. Upon receipt of a valid override from the user, the arbitrated vehicle plug status is changed to unplugged. Accordingly, the arbitrated vehicle plug status includes just two states: plugged-in and unplugged. Thus, when the charger plug status is faulty and the user attempts to start the vehicle, then the user is presented with some HMI that shows the user a message on instrument cluster 50 (e.g., "Is vehicle unplugged?"). The user is required to acknowledge "yes" to allow vehicle 10 to start (in a motive start). If the user does not acknowledge or acknowledges "no", then vehicle 10 does not start (stays in a non-motive state).

As described, a method and a system in accordance with embodiments of the present invention offer a vehicle user a way to enable the vehicle when the plug status is indeterminate. The control system fails-safe the plug status to be plugged-in when the plug status cannot be accurately detected as being either plugged-in or unplugged. The control system disables the vehicle and prevents the vehicle start until the user confirms that cord set 36 is not connected to vehicle 10 (i.e., is not plugged into vehicle 10).

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
disabling a vehicle from moving while connection status of a plug of the vehicle with an external charging infrastructure is not determined;
generating a message to advise a user to check connection status of the vehicle with the external charging infrastructure; and
enabling the vehicle to move upon a user indication via a steering wheel control of the vehicle that the vehicle is disconnected from the charging infrastructure.

2. The method of claim 1 wherein:
the message is generated in response to receiving a user request to move the vehicle while the vehicle is disabled.

3. The method of claim 1 further comprising:
generating a message advising the user that the vehicle is considered to be connected with the charging infrastructure while the vehicle is disabled.

4. The method of claim 1 further comprising:
maintaining disablement of the vehicle upon a user indication that the vehicle is connected with the charging infrastructure.

5. The method of claim 1 further comprising:
maintaining disablement of the vehicle while a user indication regarding the connection status of the vehicle with the charging infrastructure is absent.

6. The method of claim 1 wherein:
the message is generated via an instrument cluster of the vehicle.

7. The method of claim 1 further comprising:
detecting the connection status of the vehicle with the charging infrastructure.

8. The method of claim 7 further comprising:
enabling the vehicle to move while the connection status as detected is known to that the vehicle is disconnected from the charging infrastructure; and
disabling the vehicle from moving while the connection status as detected is that the vehicle is connected with the charging infrastructure.

9. The method of claim 7 wherein:
the connection status of the vehicle with the charging infrastructure is detected as a function of electrical properties between the vehicle and the charging infrastructure.

10. The method of claim 9 wherein:
the electrical properties relate to pilot and proximity signals associated with the charging infrastructure.

11. The method of claim 1 wherein:
the charging infrastructure includes a charge cord that is connectable to the vehicle;
wherein the vehicle and the charging infrastructure are connected when the charge cord is connected to the vehicle;
wherein the vehicle and the charging infrastructure are disconnected when the charge cord is disconnected from the vehicle.

12. A system comprising:
a detection system configured to detect whether a vehicle is connected to external charging infrastructure; and
a controller configured to disable the vehicle from moving while the detection system is unable to confirm that the vehicle is not connected with the external charging infrastructure, generate a message to advise a user to check the connection status between the vehicle and the charging infrastructure when the detection system is unable to confirm that the vehicle is not connected with the charging infrastructure, and enable the vehicle to move upon a user indication via a steering wheel control of the vehicle that the vehicle is disconnected from the charging infrastructure.

13. The system of claim 12 wherein:
the controller is further configured to maintain disablement of the vehicle upon a user indication that the vehicle is connected with the charging infrastructure and to maintain disablement of the vehicle while a user indication regarding the connection status of the vehicle with the charging infrastructure is absent.

14. The system claim 12 wherein:
the controller is further configured to enable the vehicle to move while the connection status as detected is known to be that the vehicle is disconnected from the charging infrastructure and to disable the vehicle from moving while the connection status as detected is known to be that the vehicle is connected with the charging infrastructure.

15. The system of claim 12 wherein:
the controller is further configured to detect the connection status of the vehicle with the charging infrastructure as a function of electrical properties between the vehicle and the charging infrastructure.

16. The system of claim 15 wherein:
the electrical properties relate to pilot and proximity signals associated with the charging infrastructure.

17. A method for a plug-in vehicle, the method comprising:
   detecting, with a detection system, the connection status between the vehicle and a charge cord;
   enabling the vehicle to move while the detection system detects that the cord is unplugged from the vehicle;
   disabling the vehicle from moving while the detection system detects that the cord is plugged into the vehicle;
   while the detection system is unable to confirm that the cord is unplugged from the vehicle, disabling the vehicle from moving, generating a message to advise a user to check the connection status, and enabling the vehicle to move upon a user indication via a steering wheel control of the vehicle that the cord is unplugged from the vehicle.

* * * * *